United States Patent
Schoenfeld et al.

(10) Patent No.: US 6,180,025 B1
(45) Date of Patent: *Jan. 30, 2001

(54) INFRARED-REFLECTING COLORANTS

(75) Inventors: Axel Schoenfeld, Wiesbaden; Andreas Stohr, Kriftel, both of (DE)

(73) Assignee: Clariant GmbH, Frankfurt (DE)

( * ) Notice: Under 35 U.S.C. 154(b), the term of this patent shall be extended for 0 days.

This patent is subject to a terminal disclaimer.

(21) Appl. No.: 09/293,700

(22) Filed: Apr. 16, 1999

(30) Foreign Application Priority Data

Apr. 17, 1998 (DE) .............................. 198 17 069

(51) Int. Cl.[7] .............................. C09K 19/00; C08J 7/18; G03G 9/00
(52) U.S. Cl. .................. 252/299.01; 252/299.67
(58) Field of Search .................. 252/299.01, 299.67, 252/299.5; 427/514; 430/106

(56) References Cited

U.S. PATENT DOCUMENTS

| | | | |
|---|---|---|---|
| 4,412,059 | 10/1983 | Krigbaum et al. | 528/192 |
| 5,362,315 | 11/1994 | Müller-Rees et al. | 106/493 |
| 5,747,175 | 5/1998 | Dietz et al. | 428/480 |
| 5,834,064 | * 11/1998 | Dietz et al. | 427/388.1 |
| 5,837,160 | 11/1998 | Dietz et al. | 252/299.01 |
| 5,922,465 | 7/1999 | Gailberger et al. | 428/407 |
| 5,976,239 | * 11/1999 | Dannenhauer et al. | 160/493 |
| 6,017,984 | * 1/2000 | Schonfeld | 524/190 |

FOREIGN PATENT DOCUMENTS

| | | |
|---|---|---|
| 4240743 | 6/1994 | (DE) . |
| 44188490 | 11/1995 | (DE) . |
| 196 12 973 | 10/1997 | (DE) . |
| 196 19 973 | 11/1997 | (DE) . |
| 196 20 746 | 11/1997 | (DE) . |
| 196 43 277 | 4/1998 | (DE) . |
| 0196785 | 10/1986 | (EP) . |
| 0283273 | 9/1988 | (EP) . |
| 0391368 | 10/1990 | (EP) . |
| 0608991 | 8/1994 | (EP) . |

* cited by examiner

*Primary Examiner*—Shean C. Wu
(74) *Attorney, Agent, or Firm*—Susan S. Jackson; Scott E. Hanf

(57) ABSTRACT

Colorant composition consisting essentially of one or more cholesteric liquid-crystalline polymers having a pitch of the helical superstructure of between 760 nm and 500 μm, and of at least one colorant which absorbs light in the visible wavelength range. Suitable colorants are organic or inorganic pigments or dyes. Coatings featuring such colorant compositions are notable for heat insulation properties.

12 Claims, No Drawings

INFRARED-REFLECTING COLORANTS

CROSS-REFERENCE TO RELATED APPLICATION

The present invention is described in the German priority application No. 198 17 069.6, filed Apr. 17, 1998, which is hereby incorporated by reference as is fully disclosed herein.

BACKGROUND OF THE INVENTION

Cholesteric liquid-crystalline main-chain polymers (cLCPs) whose color effect is dependent on viewing angle are known and can be prepared in analogy to nematic main-chain polymers by using an additional chiral comonomer (U.S. Pat. No. 4,412,059; EP-A-0 196 785; EP-A-0 608 991; EP-A-0 391 368) or by reacting nematic main-chain polymers (LCPs) with chiral comonomers (EP-A-0 283 273). Cholesteric main-chain polymers possess a helical superstructure and are distinguished by pronounced color effects that are based on selective reflection at the helical superstructure. The precise reflection wavelength in this instance depends in particular on the pitch of the helix. The helical pitch which develops depends essentially on the proportion of the chiral comonomer, on the nature of its incorporation into the polymer, on the degree of polymerization, and on the structure of the chiral comonomer. Furthermore, many systems also show a temperature dependence of the pitch in the cholesteric phase.

Heat-reflecting platelet-shaped particles are known. They generally consist of coated mica platelets. In this case the coat thickness is selected so that the reflection is within the IR range and the platelets are colorless and transparent. Owing to the dependency of the reflection on viewing angle, such platelets do not appear colorless at every viewing angle. When viewed obliquely, they generally show an unwanted greenish color shimmer. Platelets which in addition to their IR reflection exhibit a homogeneous, hiding color effect have not been described to date.

SUMMARY OF THE INVENTION

The invention relates to liquid-crystalline colorant compositions which reflect thermal radiation, to a process for their preparation and to their use.

It is the object of the present invention to provide a material which gives level colorations without inhomogeneities of color and reflects thermal radiation. It has been found that this object is surprisingly achieved by IR-reflective cholesteric liquid-crystalline polymers colored with a light-absorbing colorant, and that, in this way, novel materials are provided in a simple manner.

The present invention provides a colorant composition consisting essentially of one or more cholesteric liquid-crystalline polymers having a pitch of the helical superstructure of from 760 nm to 500 pm, in particular from 760 nm to 25 pm, and of at least one colorant which absorbs light in the visible wavelength range.

DESCRIPTION OF THE PREFERRED EMBODIMENTS

By colorants which absorb light in the visible wavelength range are meant those having at least one absorption maximum between 350 and 750 nm. For the purposes of the present invention, the term colorants embraces both dyes and pigments.

In the unoriented state, a cholesteric liquid-crystalline polymer colored with said colorant has the color of the colorant without any marked heat insulation effect. If such a sample is oriented in the cholesteric phase, then it is possible to observe not only the unchanged color properties of the colorant but also properties of reflecting thermal radiation.

The cholesteric polymers on which the invention is based comprise cholesteric liquid-crystalline main-chain polymers, cholesteric liquid-crystalline side-group polymers, and combined liquid-crystalline main chain/side-group polymers. Cholesteric liquid-crystalline side-group polymers are, for example, polysiloxanes, cyclic siloxanes, polyacrylates or polymethacrylates having mesogens in the side groups. The mesogens in the side group are, for example, cholesterol-substituted phenylbenzoates or biphenols.

The main-chain polymers are preferably liquid-crystalline polyesters, polyamides or polyesteramides which comprise aromatic and/or cycloaliphatic hydroxycarboxylic acids, aromatic aminocarboxylic acids; aromatic and/or cycloaliphatic dicarboxylic acids, and aromatic and/or cycloaliphatic diols and/or diamines; and also one or more chiral, bifunctional comonomers.

Cholesteric liquid-crystalline main-chain polymers are generally prepared from a chiral component and from hydroxycarboxylic acids and/or a combination of dicarboxylic acids and diols. In general, the polymers consist essentially of aromatic constituents. It is, however, also possible to employ aliphatic and cycloaliphatic components, such as cyclohexane dicarboxylic acid.

For the purposes of the present invention preference is given to cholesteric liquid-crystalline main-chain polymers consisting of a) from 0 to 99.8 mol % of one or more compounds from the group consisting of aromatic hydroxycarboxylic acids, cycloaliphatic hydroxycarboxylic acids and aromatic aminocarboxylic acids;

b) from 0 to 50 mol % of one or more compounds from the group consisting of aromatic dicarboxylic acids and cycloaliphatic dicarboxylic acids;

c) from 0 to 50 mol % of one or more compounds from the group consisting of aromatic and cycloaliphatic diols and diamines; and d) from 0.1 to 40 mol %, preferably from 1 to 25 mol %, of chiral, bifunctional comonomers;

the sum resulting in 100 mol %.

In the context of the stated percentages, it should be ensured that the stoichiometry—known to the skilled worker—of the functional groups for the polycondensation is secured. In addition, the polymers may also include components having only one functional group or having more than two functional groups, such as dihydroxybenzoic acid, trihydroxybenzenes or trimellitic acid, for example. In this way it is possible to influence the molecular weight of the polymers. The components having more than two functional groups act as branching site in the polymer and should be added only in low concentrations—for example, from 0 to 5 mol %—if the intention is to avoid crosslinking of the material during the condensation.

Particular preference is given to cholesteric main-group polymers which are composed of the following units of the individual monomer groups:

a) aromatic hydroxycarboxylic acids, aminocarboxylic acids:

hydroxybenzoic acids, hydroxynaphthalenecarboxylic acids, hydroxybiphenyl-carboxylic acids, aminobenzoic acids, hydroxycinnamic acids;

b) aromatic dicarboxylic acids, aliphatic dicarboxylic acids:
   terephthalic acid, isophthalic acid, biphenyldicarboxylic acids, naphthalenedicarboxylic acids, cyclohexanedicarboxylic acids, pyridinedicarboxylic acids, diphenyl ether dicarboxylic acids, carboxycinnamic acids, and also

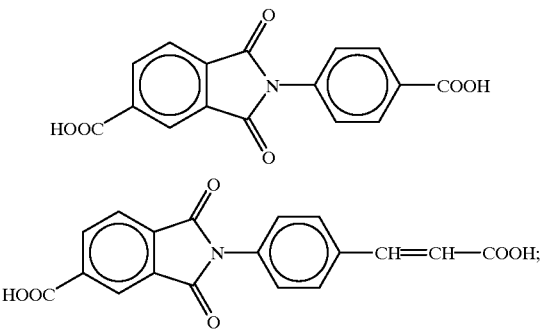

c) aromatic diols, aminophenols, diamines:
   hydroquinones, dihydroxybiphenyls, tetramethyldihydroxybiphenyls, naphthalenediols, dihydroxydiphenyl sulfones, dihydroxydiphenyl ethers, dihydroxyterphenyls, dihydroxydiphenyl ketones, phenylene diamines, diaminoanthraquinones, dihydroxyanthraquinones, and also

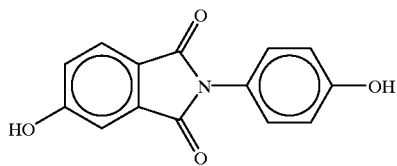

d) chiral, bifunctional monomers:
   isosorbide, isomannide, isoidide, camphoric acid, (D)- or (L)-methylpiperazine, (D)-or (L)-3-methyladipinic acid, butane-2,3-diol, and also

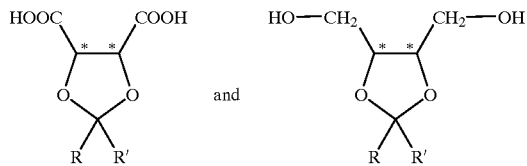

where R and R' in each case independently of one another are H, $C_1$–$C_6$-alkyl or phenyl, preferably H or $CH_3$.

The polymer units described may also include further substituents, such as methyl, methoxy, cyano or halogen, for example.

For the purposes of the present invention, very particular preference is given to polymers comprising one or more monomers from the group consisting of p-hydroxybenzoic acid, 2-hydroxy-6-naphthoic acid, terephthalic acid, isophthalic acid, 2,6-naphthalenedicarboxylic acid, hydroquinone, resorcinol and 4,4'-dihydroxybiphenyl; and also camphoric acid, isosorbide and/or isomannide as chiral component.

In order to obtain the heat insulation effect of the invention it is necessary for the oriented cholesteric polymer or the oriented cholesteric polymer blend to have a helical superstructure with a pitch corresponding to a wavelength in the IR range. The cholesteric compound predominantly reflects that component of radiation whose wavelength corresponds to the pitch of the helical superstructure. The desired pitch can be adjusted by way of the nature and/or content of chiral component in the polymer. It is also possible to adjust the pitch by mixing at least one cholesteric polymer with at least one nematic or one other cholesteric polymer. The detailed procedure is described, for example, in DE 196 12 973 A1.

The colorants on which the colorant composition of the invention is based can be organic or inorganic pigments. Examples of inorganic pigments that may be mentioned are titanium dioxide, iron oxides, metal oxide mixed-phase pigments, cadmium sulfides, ultramarine blue pigments, or chromate-molybdate pigments. Organic pigments employed can be any of the pigments well-known to the skilled worker from the relevant litetature, e.g., W. Herbst, K. Hunger, Industrielle Organische Pigmente, VCH Verlag, 1987, examples being carbon black, anthanthrone, anthraquinone, dioxazine, phthalocyanine, quinacridone, diketopyrrolopyrrole, perylene, perinone, azomethine, isoindoline or azo pigments.

The colorants on which the colorant composition of the invention is based can also be dyes which are wholly or partly dissolved in the cholesteric liquid-crystal polymer. The use of such dyes may be advantageous, since they are normally easier to incorporate into the cholesteric liquid-crystal polymer and give rise to brighter hues. Examples of suitable dyes for the purposes of the present invention are quinophthalone, perinone, anthraquinone, azomethine complex, azlactone and azo dyes.

In order to achieve specific coloristic effects, the colorants employed for the colorant composition of the invention may also comprise mixtures of different pigments or dyes, or mixtures of dyes with pigments.

The proportions of the cholesteric liquid-crystalline polymer to the colorant can vary within wide limits and are dependent on the nature of the colorant and on the particular color effect desired.

Judiciously, the colorant composition of the invention consists of 1 to 60% by weight, preferably from 3 to 20% by weight, of colorant and of from 40 to 99% by weight, preferably from 80 to 97% by weight, of cholesteric liquid-crystalline polymer. It is possible in addition for from 0 to 10% by weight, preferably from 0 to 5% by weight, based on the overall weight, of customary auxiliaries and additives from the group consisting of nonionic, anionic and cationic surfactants, synthetic and/or natural waxes, synthetic and/or natural fatty acids or fatty acid esters, stabilizers (e.g., UV or heat stabilizers, antioxidants), antistats and optical brighteners to be present in the colorant composition of the invention. Where the colorant concentrations are above about 20% by weight, the composition is generally a masterbatch which is likewise, as described below, provided by the invention.

The present invention also provides a process for preparing the colorant composition of the invention, which comprises mixing a melt of the cholesteric liquid-crystalline polymer with the colorant with or without the auxiliaries and additives until distribution is homogeneous, and heating the liquid-crystalline polymer to a temperature which is greater than or equal to its chiralization temperature. Mixing can be carried out using all mixing equipment suitable for the purpose, examples being dispersion kneaders, ®Banbury kneaders or screw-type compounders, or by extrusion in, for example, a single-screw or twin-screw extruder.

In a further embodiment, the colorant can also be added directly during the preparation of the cholesteric liquid-crystalline polymer, judiciously toward the end of the polycondensation reaction and, preferably, directly prior to discharge of the finished polymer.

It is also possible to incorporate the colorant in the form of a masterbatch into the cholesteric liquid-crystal polymer. Vehicles employed for a masterbatch can be synthetic and natural waxes, polymers and rubbers. The preferred vehicle for a masterbatch, however, is the cholesteric liquid-crystal polymer itself. The masterbatch can comprise a pigment or a dye or else a mixture of different pigments and/or dyes. Furthermore, additional auxiliaries and/or additives can be incorporated into the masterbatch. Such masterbatches can be prepared by all known methods, for example, by intimate mixing of the colorants with the vehicle in the melt in appropriate mixing equipment, examples of which are dispersion kneaders, Banburry kneaders or screw-type compounders, such as twin-screw extruders. The coloring of the cholesteric liquid-crystalline polymer with the masterbatch can be carried out by mixing the two materials and then extruding the mixture. Alternatively, the masterbatch as a melt can be metered into the melt of the cholesteric liquid-crystal polymer by way of a lateral extruder and/or a melt pump. The most economic method is to do this during the discharge of the cholesteric liquid-crystalline polymer from the reactor after the polycondensation.

The colored liquid-crystalline polymers prepared by the processes described above are normally in the form of a physical mixture of colorant and polymer. Since the preparation process generally entails working at relatively high temperatures, it is impossible to rule out the occurrence of at least partial chemical bonding to the cholesteric liquid-crystalline polymer, especially in the case of dyes having functional groups such as carboxyl, sulfo or hydroxy.

The preparation of the cholesteric liquid-crystalline polymers can be carried out by subjecting the monomeric compounds on which said polymer is based, as such or in the form of a reactive derivative, to condensation in the melt, in solution or in emulsified or disperse phase.

Either the monomers employed in accordance with the invention can be employed directly, or else judicious precursors can be used which react under the subsequent reaction conditions to form the desired monomers. Thus, for example, aminophenol and trimellitic anhydride can be employed in place of N-(4-hydroxyphenyl)trimellitimide.

The polycondensation can be carried out by any customary method. A suitable example is the melt condensation with acetic anhydride that is described, for example, in EP-A-0 391 368. Condensation with acetic anhydride is also possible in solution or in disperse or emulsified phase.

Linkage of the monomers preferably takes place by way of ester linkages (polyester), amide linkages (polyesteramide/polyamide) and/or by way of imide linkages (polyesterimide/polyimide), although linkage can also take place by way of other known types of linkage, such as carbonate, for example.

In place of the carboxylic acids, it is also possible to employ carboxylic acid derivatives, such as acid chlorides or carboxylic esters, for example. In place of the hydroxy components, it is also possible to employ corresponding hydroxy derivatives, such as the acetylated hydroxy compounds, for example.

The polymers employed in accordance with the invention can also comprise crosslinkable groups, so that it is possible to fix an orientated liquid-crystal polymer by means, for example, of photocrosslinking. Crosslinked cLCPs can be obtained, moreover, by carrying out direct crosslinking of low molecular mass precursors having at least three functional groups or having at least two polymerizable double bonds.

In a preferred embodiment, the cLCPs employed in accordance with the invention are of very low solubility, with the result that their molecular weights cannot be determined by commercially customary methods (GPC, light scattering). As a measure of the molecular weight it is possible to utilize the intrinsic viscosity of the polymers in a solution of pentafluorophenol/hexafluoroisopropanol. Preference is given to polymers having an intrinsic viscosity of between 0.1 dl/g and 10 dl/g. The polymers employed in accordance with the invention can be employed directly. An alternative option is to employ, as polymers of the invention, blends which consist of two or more, preferably 2, cholesteric liquid-crystalline polymers, or which consists of one or more nematic and one or more cholesteric liquid-crystalline polymers. The components of a blend are judiciously chosen so as to result in a pitch difference of the helical superstructure of between 760 nm and 500 $\mu$m.

The colorant compositions of the invention can be subjected to further processing in the form of a material of construction. A material of construction is a shaped structure such as, for example, injection moldings, extruded profiles or pipes, tapes, sheets or fibers. However, the colorant compositions of the invention are particularly suitable for coating articles which are not to become too highly heated—for example, as a constituent in OEM automotive coatings—and for producing platelet-shaped pigments.

Platelet-shaped pigments can be produced, for example, by applying the colorant composition of the invention, in the melt or as a dispersion, to a support sheet by knife coating and then heating the assembly to the chiralization temperature. After cooling, the film is removed from the support sheet and comminuted to the desired platelet size. The platelet-shaped pigments obtained in this way can be applied as colorants in coating materials.

Effect powder coatings can be applied by the following preferred methods:

A finely divided powder of the colorant composition of the invention is electrostatically charged in accordance in the course of the spraying process. This happens, in the case of the corona process, by passing the powder in front of a charged corona, during which the powder itself becomes charged. In the triboelectric or electrokinetic process, the principle of triboelectricity—frictional electricity—is utilized. Within the spraying equipment, the powder receives an electrostatic charge which is opposite to the charge of the friction partner, generally a hose or a spraying pipe (made, for example, of polytetrafluoroethylene). The electrostatic charging leads to a high deposition rate of the powder on the article to be coated. Following the process of application to the article, the powder layer is heated to temperatures above the softening point of the powder, at which the polymers form a homogeneous film and the helical superstructures are formed. The temperature at which formation of the helical structure begins is referred to below as the chiralization temperature. The specific heat insulation properties of a powder coating are only observed when the polymer molecules, at or above the chiralization temperature, develop the helical structure which is responsible for the reflection of IR radiation. Transition to the cholesteric phase takes place in many cases as early as during the synthesis of the polymers. The wavelength of selective reflection of the cLCPs employed in accordance with the invention is determined by the pitch of the helical structure. The pitch is dependent on the structure of the polymer, on the melt viscosity, on the presence of solvents, and, in particular, on the helical twisting power of the chiral monomer. Furthermore, it is a function of the temperature. Accordingly, the pitch of the helix can also be adjusted by way of the temperature. Rapid cooling of the coated substrates allows the pitch of the helix and thus the wavelength of selective reflection to be "frozen in" permanently. The general rule is that, as the content of chiral monomers goes up, the twisting of the helix increases and thus the pitch of the helix goes down.

The formation of the helical structure can be favored by the temperature, by the action of shear forces, and by substrates having polymeric coats, for example, polyvinyl alcohol, cellulose derivatives and polyimides. The orientation process of the polymer molecules can also be positively influenced by electrical and magnetic fields, depending on the structure of the polymers.

A further, preferred possibility for coating articles with pulverulent substances is by flame spraying. With this technique, the powder is fluidized with a carrier gas (in a fluidized bed, for example) and supplied to the central nozzle of a flame spraygun. At the same time, in the flame spraygun, a fuel-gas/oxygen mixture is produced which is burnt in numerous small flamelets arranged in a ring formation around the center. In this case the pulverulent particles melt and are subsequently deposited on the article that is to be coated, in the form of droplets which coalesce during the spray process to form a film. This process offers the particular advantage that the melting operation is integrated into the spraying process, so that application of the coating to the article, and film formation, can take place in one operation.

Another preferred embodiment for powder coating is the fluidized-bed sintering technique. For this technique, a fluidized bed is generated in a suitable container with the aid of a carrier gas and the colorant composition of the invention. In a separate heat chamber, the article to be coated is heated to the temperature required for coating, and on reaching this temperature it is dipped for a defined period into the fluidized bed. In the course of dipping, pulverulent particles remain adhering to the surface of the article, melt, coalesce to form a film, and form the helical structure. In some cases it is advantageous to subject the coated article to further thermal treatment in order to improve film formation and the orientation of the polymer molecules. In other cases the article is allowed to cool in air or is quenched with water. This technique also offers the particular advantage that the melt operation is integrated into the coating process, so that application of the coating to the article, orientation of the polymer molecules, and film formation can take place in one operation.

In all of the powdered coating techniques described, and especially in the case of the fluidized-bed sintering and flame spraying process, the particle morphology and thus the flowability of the powder, and also its particle-size distribution, are of great importance. Preferred particles are those which come as close as possible to the spherical form and have a narrow particle-size distribution. Spherical particles are obtained by simple means in processes in which the polymerization is carried out in an emulsified or dispersed phase. Depending on the type of mill employed, the milling processes produce narrower or broader particle-size distributions. In certain cases it is advantageous to follow milling by a sieving, classifying or screening procedure in order to obtain as narrow as possible a particle-size distribution. In some cases it is advantageous first to prepare a very finely divided powder which can then be subjected to controlled agglomeration to give the desired particle size.

The desired grain fineness is critical for the coat thickness of the powder coating, the nature of the article to be coated, and the application technique employed. If thin coating films are desired on the article that is to be coated, an average particle size of the powder of between 1 and 100 $\mu$m, preferably between 15 and 80 $\mu$m, is desirable. If thick films are desired on the article, as are normally applied in the case of fluidized-bed sintering and flame spraying, then an average particle size of between 80 and 300 $\mu$m, preferably from 100 to 250 $\mu$m, is advantageous. In the case of fluidized-bed sintering and flame spraying, special attention must be paid to observing the particle size limits. Particles that are too small are heated excessively by the high flame temperatures and are carbonized, or are blown away by the gas flow. Particles that are too coarse, on the other hand, are not melted completely and are unable to undergo optimum orientation in the course of subsequent film formation. In exceptional cases, however, it may also be advantageous to use a particle-size distribution lying outside this range.

Heat insulation powder coatings can be applied to a very wide variety of substrates. These substrates may, for example, be articles made of natural and synthetic materials, such as wood, plastics, paper, metal or glass. Particular preference is given to coating the bodywork, or parts of the bodywork, of motor vehicles.

In preferred cases the heat insulation coating is applied to metal or plastic substrates. In most cases these carry a prior coat. In other words, plastic substrates can be provided with a plastics primer, and metallic substrates generally possess an electrophoretically applied primer with or without one or more further coats, such as a surfacer coat, for example.

The heat insulation coatings can be coated by customary methods with a clearcoat. Suitable clearcoats are, in principle, all known transparent coating materials. In this context, it is possible to employ both solventborne one-component or two-component coating materials and also, preferably, water-thinnable clearcoats and, in particular, powder coating materials. In some cases it may be judicious to choose a somewhat thicker clearcoat film or to apply two clearcoat films comprising identical or different liquid clearcoats or transparent powder coatings. As is known, the clearcoat contains further auxiliaries which enhance the surface properties of the coated articles. Mention may be made, for example, of UV stabilizers and light stabilizers, which protect the underlying coats against degradation reactions.

A further possibility of converting colorant compositions of the invention into heat insulation coatings is that of melt coating. In this case the colorant composition is applied as a melt to the substrate, or is melted on the substrate, and is processed to form a thin film. One example of a suitable means of applying the polymer melt is a heatable coating bar. Application can also be made, however, using more simple means, such as a filling knife or trowel, for example.

The coatings of the invention are notable for simple application techniques and for their properties of reflecting thermal radiation in conjunction with almost infinitely adjustable homogeneous color properties as a one-component system, these properties being unobtainable by the one-component systems known in the prior art.

The colorant compositions of the invention can also, as they are or in the form of platelet-shaped pigments, be employed in components for contactless printing processes, such as in electrophotographic toners and developers and in ink-jet inks.

In the following examples, parts are by weight.

EXAMPLE 1

7.4 mol of 2-hydroxy-6-naphthoic acid, 15 mol of 4-hydroxybenzoic acid, 4.5 mol of 4,4'-dihydroxybiphenyl and 3 mol of (1R,3S)-(+)-camphoric acid in a reactor are admixed with 30.75 mol of acetic anhydride and the mixture is flushed through with a gentle stream of nitrogen. The mixture is heated to 140° C. over the course of 15 minutes with stirring and this temperature is maintained for 45 minutes. Thereafter, the temperature is raised to 325° C. over the course of 240 minutes and stirring of the melt is continued at this temperature for 60 minutes. From about 220° C., acetic acid begins to distill off. Thereafter, nitrogen flushing is terminated and reduced pressure is slowly applied. The melt is stirred under reduced pressure (about 25 mbar) for a further 30 minutes. It is then subjected to nitrogen and the polymer is discharged and pelletized.

The polymer has a slight pale-gray/beige coloration. The polymer reflects IR radiation.

EXAMPLE 2

97% by weight of cholesteric liquid-crystal polymer prepared in accordance with Example 1 are mixed with 3% by weight of C.I. Pigment Red 149 and the mixture is then extruded in a ®Rheomex single-screw extruder (from Haake; screw diameter 19 mm; length L/D=25:1; screw with mixing zone). The intake zone is heated to 240° C. and the subsequent zones to 275° C. The plastic mass is taken off in a strand and is chopped into pellets. The colorant composition obtained has a level red color which exhibits no viewing-angle-dependent color effect but does reflect IR radiation.

EXAMPLE 3

90% by weight of cholesteric liquid-crystal polymer prepared in accordance with Example 1 are mixed with 10% by weight of C.I. Pigment Blue 15:1 and the mixture is then extruded in a ®Rheomex single-screw extruder (from Haake; screw diameter 19 mm; length L/D=25:1; screw with mixing zone). The intake zone is heated to 240° C. and the subsequent zones to 275° C. The plastic mass is taken off in a strand and is chopped into pellets. The colorant composition obtained has a level blue color which exhibits no viewing-angle-dependent color effect but does reflect IR radiation.

EXAMPLE 4

The colorant composition prepared in Example 2 is milled to a grain fineness<2 mm in a cutting mill. Final milling takes place on an air-jet mill with metering unit. The product is a red powder having an average particle size $D_{50}$ of 33 $\mu$m.

EXAMPLE 5

Producing an effect powder coating with a triboelectric spraygun:

The powder prepared in Example 4 is filled into the powder container of the spraying device "®Tribostar" from Intec, Dortmund. The spraying device is equipped with a standard spraying pipe and a star-shaped internal rod. This spraying device is used to coat an aluminum panel, primed with a black powder coating, by crosswise application in a spraybooth from Intec, Dortmund, at a high powder throughput and at a spraying pressure of 3 bar. For film formation, the coated panel is heated at 225° C. for 15 minutes and then dipped in water. A homogeneous film is obtained which exhibits a level red color and IR reflection.

EXAMPLE 6

The colorant composition prepared in Example 3 is milled to a grain fineness<2 mm in a cutting mill. Final milling takes place on an air-jet mill with metering unit. The product is a blue powder having an average particle size $D_{50}$ of 6 $\mu$m.

EXAMPLE 7

Using the material from Example 6, a 30% by weight dispersion in isobutanol is prepared with stirring. The dispersion is drawn onto a polyimide film using a spiral-wound doctor blade whose gap width is 24 $\mu$m. After the applied dispersion has dried, the polyimide film with the applied powder is briefly heated to 280° C. After cooling, the polymer film (film thickness about 10 $\mu$m) is scraped off the polyimide film and the shards obtained are milled in a universal mill. In order to narrow down the particle-size distribution, the milled material is passed through a sieve with a mesh size of 40 $\mu$m. The pigment obtained is incorporated into a 2-component clearcoat, sprayed onto a model car, and covered with a clearcoat. The model car shows an appealing blue color and reflects IR radiation.

What is claimed is:

1. A colorant composition consisting essentially of one or more cholesteric liquid-crystalline polymers having a pitch of the helical superstructure of between 760 nm and 500 $\mu$m and of at least one colorant which absorbs light in the visible wavelength range.

2. The colorant composition as claimed in claim 1, wherein the pitch of the cholesteric liquid-crystalline polymer is between 760 nm and 25 $\mu$m.

3. The colorant composition as claimed in claim 1, wherein the cholesteric liquid-crystalline polymers are side-group polymers which in the main chain comprise polysiloxanes, cyclic siloxanes, polyacrylates, polymethacrylates or a combination thereof, and in the side chains comprise mesogenic groups.

4. The colorant composition as claimed in claim 1, wherein the cholesteric liquid-crystalline polymers are main-chain polymers which are liquid-crystalline polyesters, polyamides or polyesteramides which comprise aromatic hydroxycarboxylic acids, cycloaliphatic hydroxycarboxylic acids, aromatic aminocarboxylic acids; aromatic dicarboxylic acids, cycloaliphatic dicarboxylic acids and aromatic diols, cycloaliphatic diols, aromatic diamines, cycloaliphatic diamines or a combination thereof; and also one or more chiral, bifunctional comonomers.

5. The colorant composition as claimed in claim 4, wherein the main-chain polymer consists of from 0 to 99.8 mol % of one or more compounds from the group consisting of aromatic hydroxycarboxylic acids, cycloaliphatic hydroxycarboxylic acids and aromatic aminocarboxylic acids;

from 0 to 50 mol % of one or more compounds from the group consisting of aromatic dicarboxylic acids and cycloaliphatic dicarboxylic acids;

from 0 to 50 mol % of one or more compounds from the group consisting of aromatic diols, cycloaliphatic diols, aromatic diamines and cycloaliphatic diamines; and from 0.1 to 40 mol % of chiral, bifunctional comonomers; the sum resulting in 100 mol %.

6. The colorant composition as claimed in claim 1, wherein a chiral, bifunctional comonomer from the group consisting of isosorbide, isomannide, isoidide, camphoric acid, (D)- or (L)-methylpiperazine, (D)- or (L)-3-methyladipic acid, butane-2,3-diol,

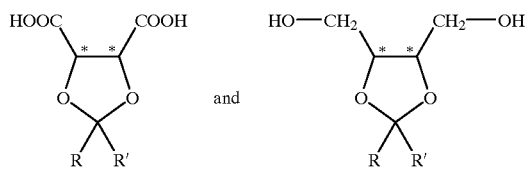

where R and R' in each case independently of one another are H, $C_1$–$C_6$-alkyl or phenyl or a combination thereof, is present in the cholesteric liquid-crystalline polymer.

7. The colorant composition as claimed in claim 1, wherein the colorant is carbon black or an anthanthrone, anthraquinone, dioxazine, phthalocyanine, quinacridone, diketopyrrolopyrrole, perylene, perinone, azomethine, isoindoline or azo pigment.

8. The colorant composition as claimed in claim 1, wherein the colorant is a quinophthalone, perinone, anthraquinone, azomethine complex, azlactone or azo dye.

9. The colorant composition as claimed in claim 1, consisting of from 1 to 60% by weight of colorant, from 40 to 99% by weight of cholesteric liquid-crystalline polymer, and from 0 to 10% by weight of customary auxiliaries and additives.

10. A process for preparing a colorant composition wherein said colorant composition consists essentially of one or more cholesteric liquid-crystalline polymers having a pitch of the helical superstructure of between 760 nm and 500 µm and of at least one colorant which absorbs light in the visible wavelength range, comprising:

mixing a melt of the cholesteric liquid-crystalline polymer with the colorant with or without the auxiliaries and additives until distribution is homogeneous, or adding the colorant with or without the auxiliaries and additives during the polycondensation of the polymer;

and heating the liquid-crystalline polymer to a temperature which is greater than or equal to its chiralization temperature.

11. The process as claimed in claim 10, wherein the polymer is a blend of two or more cholesteric liquid-crystalline polymers or is a blend of a nematic and a cholesteric liquid-crystalline polymer.

12. A method of providing a heat insulation coating, comprising the step of applying a colorant composition onto an object to be coated wherein said colorant composition consists essentially of one or more cholesteric liquid-crystalline polymers having a pitch of the helical superstructure of between 760 nm and 500 µm and of at least one colorant which absorbs light in the visible wavelength range.

* * * * *